US011801940B2

(12) United States Patent
Daly et al.

(10) Patent No.: US 11,801,940 B2
(45) Date of Patent: Oct. 31, 2023

(54) QUICK RELEASE SYSTEM FOR IFE DISPLAY SCREENS

(71) Applicant: Thales Avionics, Inc., Irvine, CA (US)

(72) Inventors: John J. Daly, Irvine, CA (US); Kevin Judd, Irvine, CA (US)

(73) Assignee: Thales Avionics, Inc., Irvine, CA (US)

( * ) Notice: Subject to any disclaimer, the term of this patent is extended or adjusted under 35 U.S.C. 154(b) by 244 days.

(21) Appl. No.: 17/382,729

(22) Filed: Jul. 22, 2021

(65) Prior Publication Data

US 2022/0024592 A1     Jan. 27, 2022

Related U.S. Application Data

(60) Provisional application No. 63/056,146, filed on Jul. 24, 2020.

(51) Int. Cl.
| | |
|---|---|
| *B64D 11/00* | (2006.01) |
| *B60R 13/02* | (2006.01) |
| *B60R 11/00* | (2006.01) |

(52) U.S. Cl.
CPC .... *B64D 11/00152* (2014.12); *B60R 13/0206* (2013.01); *B60R 2011/0017* (2013.01)

(58) Field of Classification Search
CPC ...................... B64D 11/00152; B60R 13/0206
See application file for complete search history.

(56) References Cited

U.S. PATENT DOCUMENTS

| | | | |
|---|---|---|---|
| 9,695,972 B1 * | 7/2017 | Jiang | |
| 10,569,718 B2 * | 2/2020 | Barnes | B64D 11/00151 |

FOREIGN PATENT DOCUMENTS

EP         3339173 A1 *   6/2018      B64D 11/00152

* cited by examiner

*Primary Examiner* — Anthony D Barfield
(74) *Attorney, Agent, or Firm* — SAGE PATENT GROUP

(57) ABSTRACT

A display apparatus receptacle configured to be mounted to a passenger seat. The display apparatus receptacle includes a pair of main latch assemblies releasably connectable to a striker of a display apparatus. The pair of main latch assemblies include an activation rod having an end with sloped teeth. The pair of main latch assemblies also include a lock rod with an end having sloped teeth and attached to a pair of latch plates. The pair of main latch assemblies also include a pair of lock pawls rotatable by movement of the latch plates. The pair of main latch assemblies also include a lock rod spring having a spiral shape about a rod extending axially through the lock rod to connect to the activation rod, the lock rod spring resiliently urging the sloped teeth of the lock rod to engage the sloped teeth of the activation rod.

20 Claims, 20 Drawing Sheets

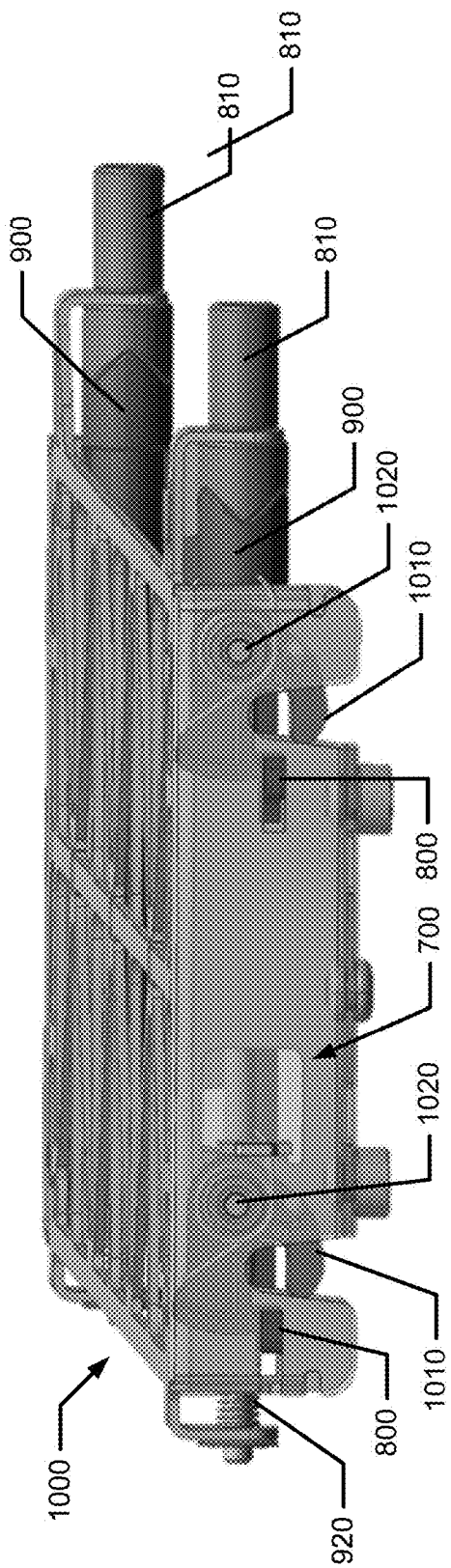
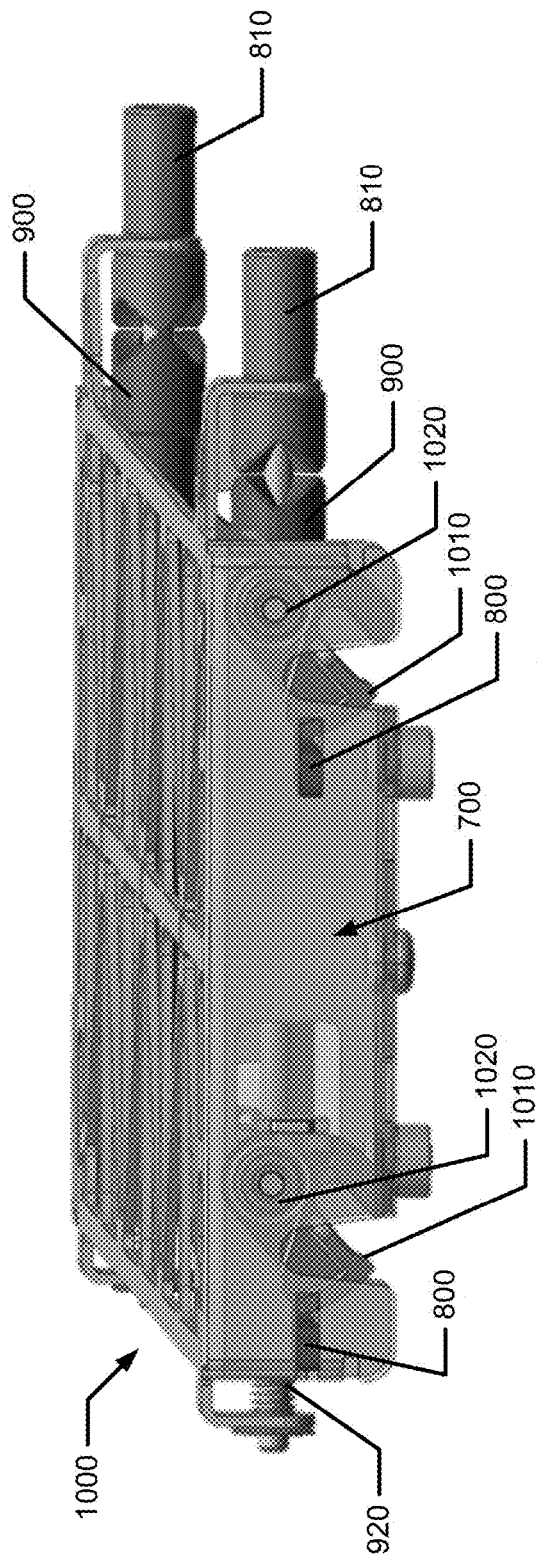
*Figure 10a*
*Figure 10b*

QUICK RELEASE SYSTEM FOR IFE DISPLAY SCREENS

CROSS REFERENCE TO RELATED APPLICATION

This application claims the benefit of U.S. Provisional Patent Application Ser. No. 63/056,146, filed on Jul. 24, 2020, the disclosure and content of which is incorporated by reference herein in its entirety.

FIELD OF THE INVENTION

The present invention relates generally to mounting assemblies for display devices which can be mounted in seatbacks and other surface, and in particular, to display devices having mounting assemblies that provide for detachable mounting arrangements.

BACKGROUND

Commercial passenger airlines typically arrange seats in rows to efficiently use the available space for passenger accommodation. The intended goal is to maximize the quantity of passengers that that the aircraft can carry per flight for economical use of the vehicle. Commercial passenger transport is a very competitive business requiring efficient operation.

Frequently, commercial passenger airlines include in-flight entertainment systems as a way to improve passenger satisfaction. In-flight entertainment systems are especially common on aircraft used for longer flight routes. In-flight entertainment systems often include a display device or monitor mounted on passenger seat backs. A passenger sitting in a seat facing the display device can use the display device to reproduce digital information such as video, audio, text, images, and more, depending on the in-flight entertainment system.

In the past, display devices have been used that require partially disassembling a seat to install or remove the display device. More particularly, the display devices required attachment to mounting points on internal seat structure and attachment to an electrical harness in the seat. Once mounted, the display device is supported by the internal seat structure with the screen of the display device exposed from the seatback for viewing. At least one prior art arrangement requires installation of the display device through the front of the back support of a seat.

An advantage of the foregoing prior arrangements is that the display devices mount very securely to internal seat structure. The mountings need to prevent unauthorized detachment by passengers and withstand severe turbulence and strong deceleration events.

While the foregoing arrangement provides for secure mounting of a display, there are drawbacks. A major drawback is that it is labor intensive and time consuming to mount the display devices. It can require an unacceptable time to disassemble each seat, fasten a display device to the internal mounting points and connect an electrical harness to the display device. It can be very time consuming to initially equip an aircraft with such display devices as larger commercial passenger aircraft have hundreds of seats. Further, it is labor intensive and time consuming to repair or replace defective display devices after they have been installed.

The present invention addresses the foregoing drawbacks of conventional display device or monitor mounting arrangements by providing a mounting assembly permitting more rapid attachment and detachment of a display device, while securely holding the display device and preventing unauthorized detachment.

SUMMARY

Various embodiments of the present disclosure are directed to a display apparatus receptacle configured to be mounted to a passenger seat. The display apparatus receptacle includes a pair of main latch assemblies releasably connectable to a striker of a display apparatus. The pair of main latch assemblies include an activation rod having an end with sloped teeth. The pair of main latch assemblies also include a lock rod with an end having sloped teeth and attached to a pair of latch plates. The pair of main latch assemblies also include a pair of lock pawls rotatable by movement of the latch plates. The pair of main latch assemblies also include a lock rod spring having a spiral shape about a rod extending axially through the lock rod to connect to the activation rod, the lock rod spring resiliently urging the sloped teeth of the lock rod to engage the sloped teeth of the activation rod. The pair of locking pawls are configured to releasably latch to a pair of pawl engagement cylinders of the striker of the display apparatus.

In some embodiments, the activation rod is configured to be rotated by a display release tool engaging an end of the activation rod to rotate the activation rod so the sloped teeth of the activation rod engaging the sloped teeth of the lock rod translationally slides the lock rod in a first direction causing the pair of latch plates to disengage a sloped surface of the pair of locking pawls and move to a freed location which disengages the pair of locking pawls from and frees the pawl engagement cylinders of the striker of the display apparatus.

In some embodiments, A display apparatus includes a display and a striker. The striker is attached to a back surface of the display apparatus that is releasably connectable to a pair of main latch assemblies in a display apparatus receptacle in a passenger seat. The striker includes a latch bracket. The striker also includes a pair of pawl engagement cylinders connected to the latch bracket and positioned to be releasably engaged by the pair of main latch assemblies. The striker also includes a guiding pin connected to the latch bracket and positioned relative to the pair of pawl engagement cylinders to guide their engagement with the pair of main latch assemblies.

Other seat video display units, systems, and corresponding methods according to embodiments of the inventive subject matter will be or become apparent to one with skill in the art upon review of the following drawings and detailed description. It is intended that all such additional seat video display units, systems, and corresponding methods be included within this description, be within the scope of the present inventive subject matter and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which:

FIGS. 10a and 10b illustrate a pair of quick release mechanisms including a pair of main latch assemblies supported by a frame configured according to some embodiments of the present disclosure;

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Some embodiments of the present disclosure generally relates to in-flight entertainment systems. Specifically, embodiments of the present disclosure relates to improvements in providing a quick release system for removal and replacement of screens on seats and other surfaces which may be within an aircraft, other vehicle, or non-vehicles.

Although various embodiments of the present invention are explained herein in the context of an airplane environment, other embodiments are not limited thereto and may be used in other environments, including other vehicles such as ships, submarines, buses, trains, commercial/military transport aircraft, and automobiles, as well as buildings such as conference centers, sports arenas, hotels, homes, etc. Accordingly, in some embodiments users are referred to, in a non-limiting way, as passengers. Passengers may include people who buy tickets, crew members, and/or other representatives of the vehicle operators, including without limitation, employees and representatives of airline, train, automobile, cruise ship, and bus operators.

There are other systems on the market, but the embodiments discussed in the present disclosure solve some of the deficiencies of those systems. The other systems on the market are prone to having a false positive latching condition, in which case the display device (including a display screen) appears to the person who is installing the screen to be locked in place but is not locked. The other systems on the market also do not provide visible or audible indications that a display device is locked or has become or remains unlocked.

Figure 1:
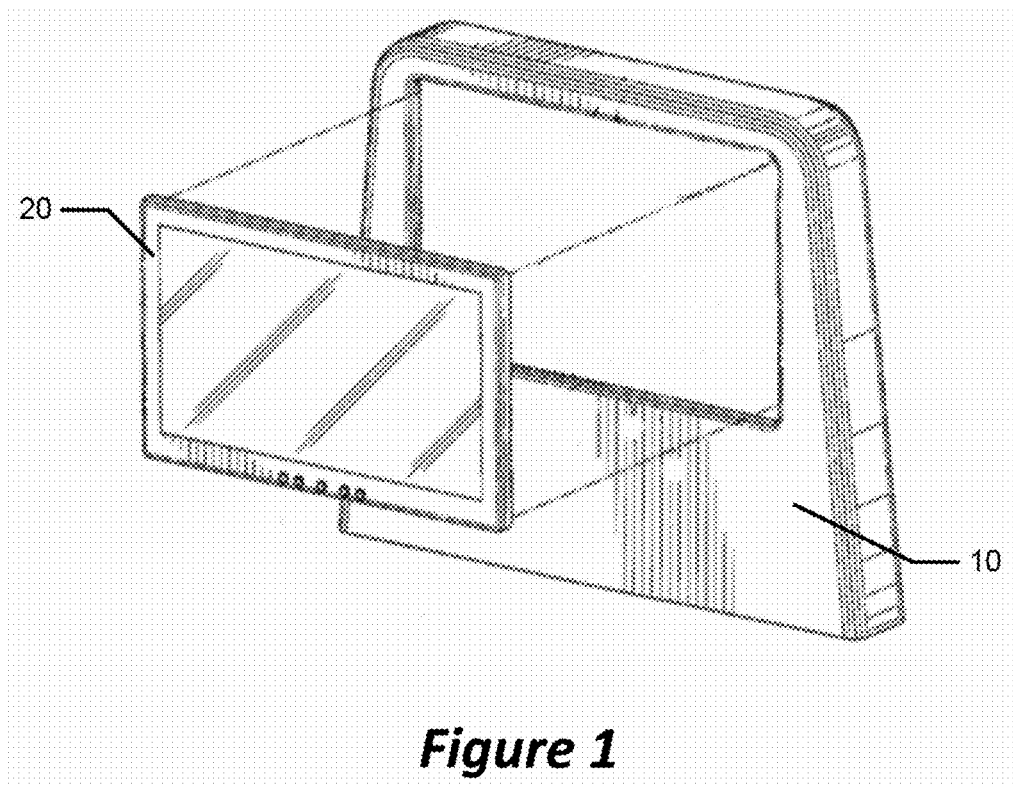
FIG. 1 illustrates a back view of a portion of a passenger seat adapted to receive a seat video display unit (SVDU)

FIG. 1 illustrates a back view of a portion of a passenger seat 10 adapted to receive a seat video display unit (SVDU) 20. The seat 10 includes a recessed area in which the SVDU 20 can be inserted and manipulated to combine attached.

Figure 2:
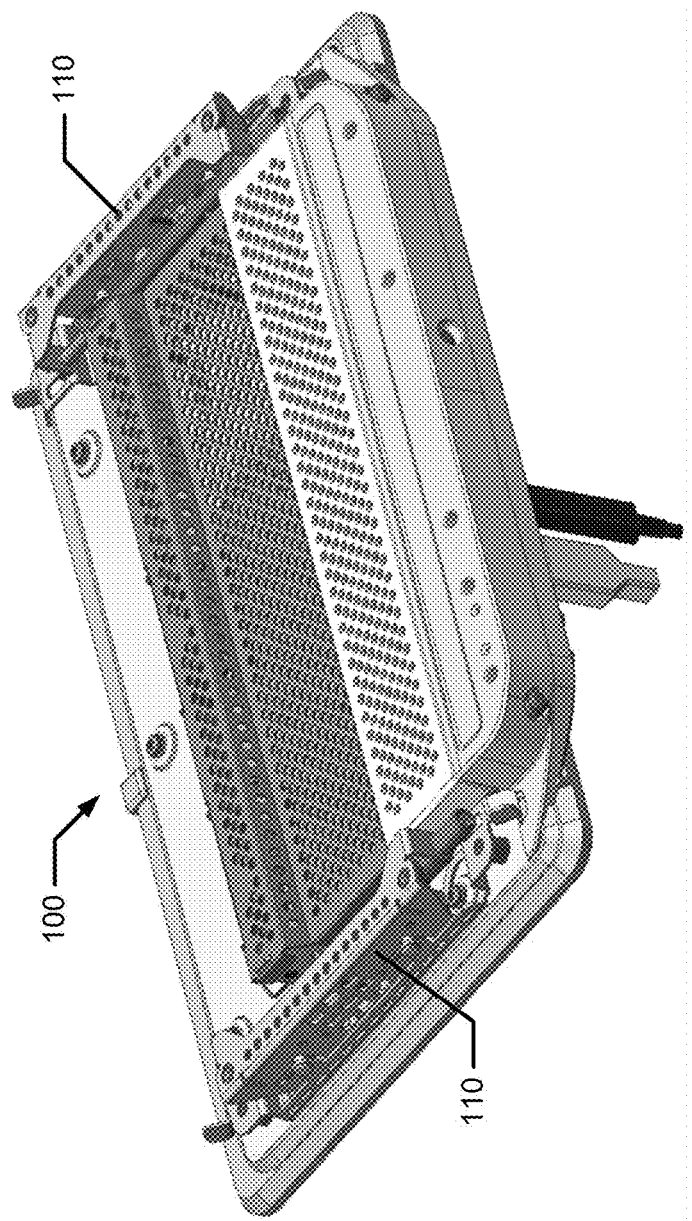
FIG. 2 illustrates an isometric view of a small seat video display unit (SVDU) and a pair of quick release mechanisms in accordance with some embodiments of the present disclosure.

FIG. 2 illustrates an isometric view of a small seat video display unit (SVDU) 100 and a pair of quick release mechanisms 110. The illustrated components of the SVDU 100 and mechanisms 110 are described in detail below with reference to further illustrated figures thereof.

Figures 3A, 3B:
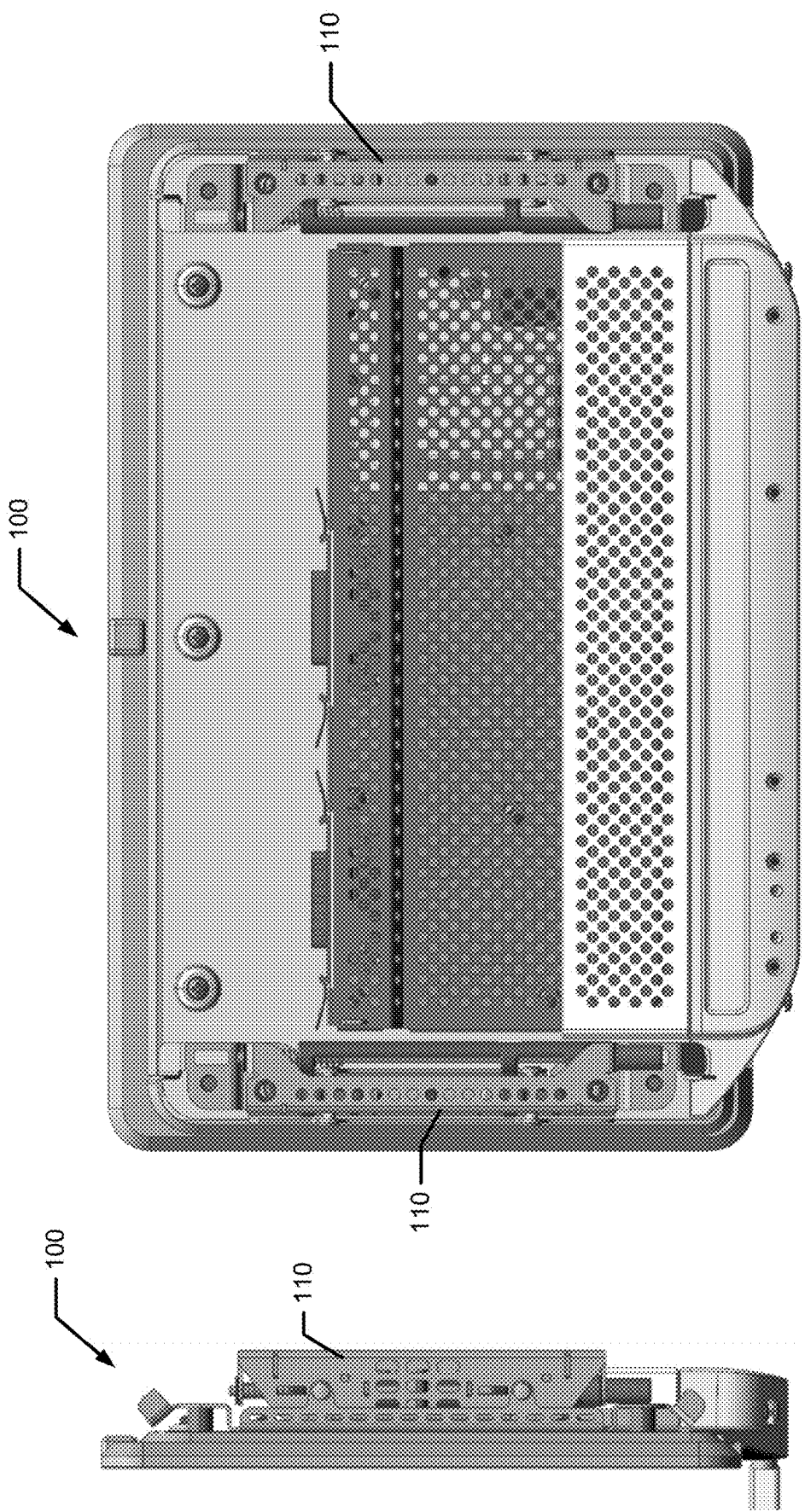
FIGS. 3a and 3b illustrate a side view and back view of a small version of a SVDU latch system having a SDVU and a pair of quick release mechanisms configured according to some embodiments of the present disclosure.

FIGS. 3a and 3b illustrate a side view and back view, respectively, of a small version of a SVDU latch system having a SDVU 100 and a pair of quick release mechanisms 110. The illustrated components of the SVDU 100 and mechanisms 110 are described in detail below with reference to further illustrated figures thereof.

Figure 4:
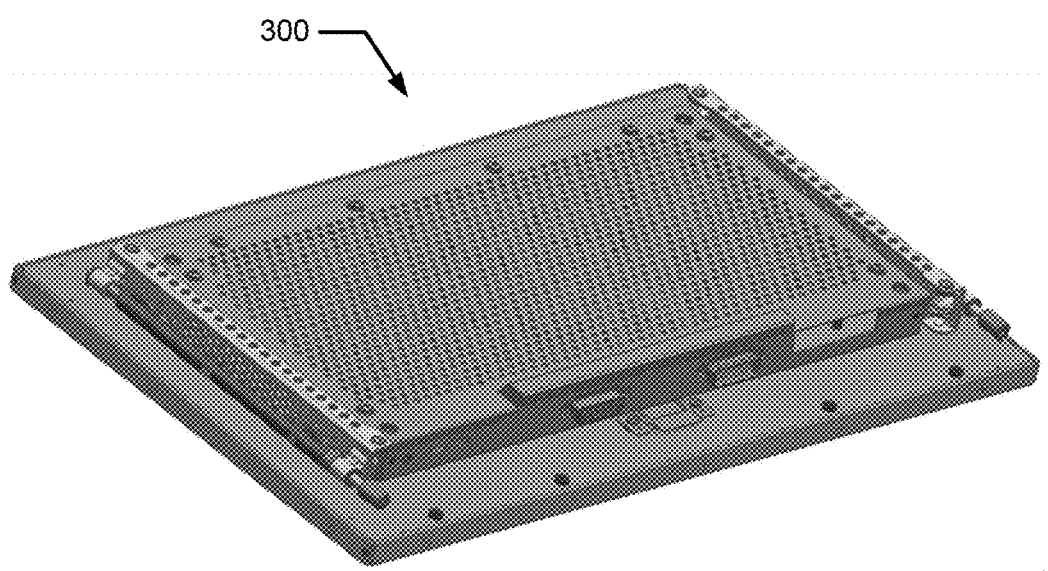
FIG. 4 illustrates a large version of a display unit configured according to some embodiments of the present disclosure.

FIG. 4 illustrates a large version of a display unit 300 in accordance with some embodiments of the present disclosure. The display unit 300 can be releasably attached to the pair of quick release mechanisms 110 which, in turn, can be attached to a seatback or other surface and operate and described in detail below with reference to further illustrated figures thereof.

Figure 5A:
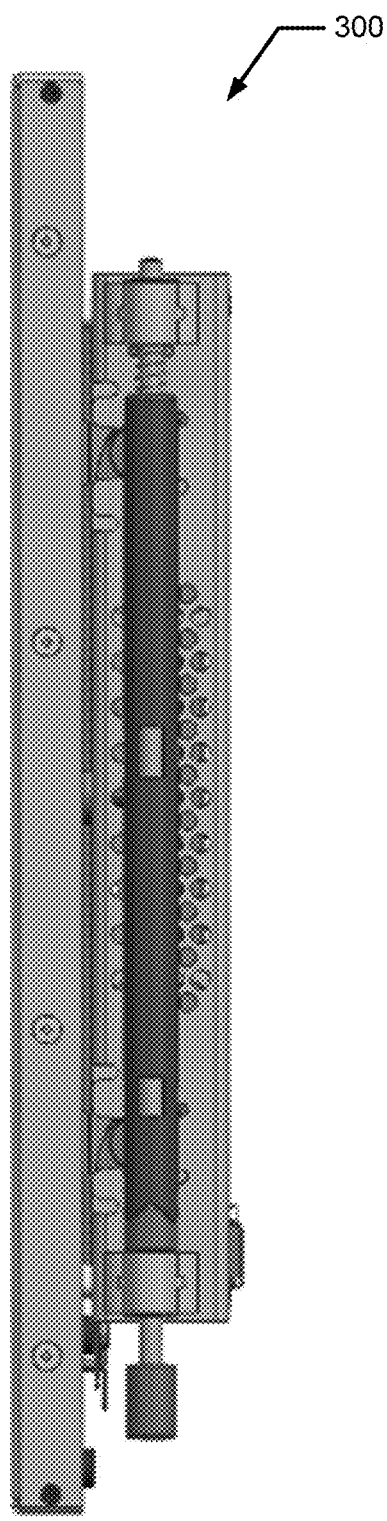
FIG. 5a illustrates a side view of a large version of a display unit configured according to some embodiments of the present disclosure.
Figure 5B:
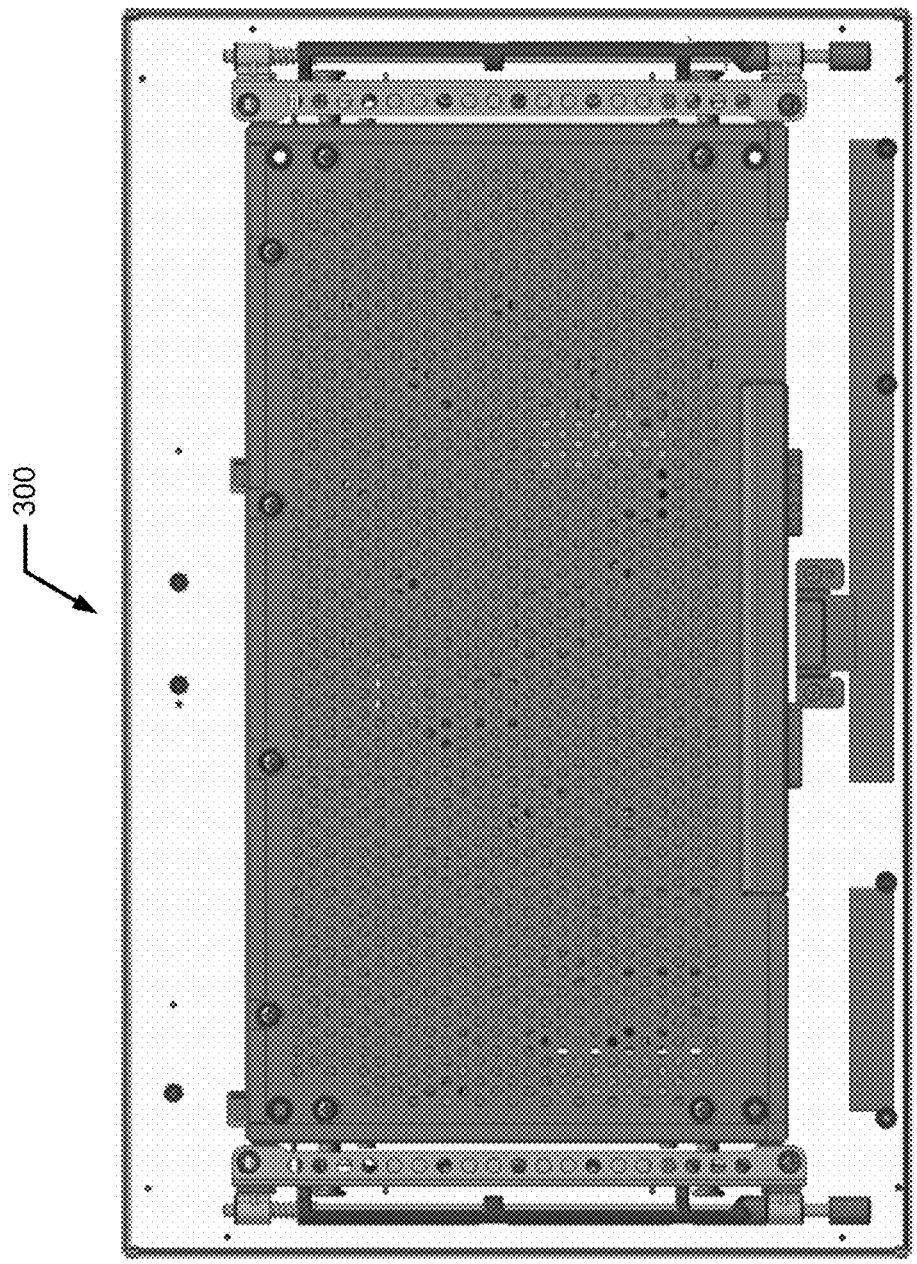
FIG. 5b illustrates a back view of a large version of a display unit configured according to some embodiments of the present disclosure.

FIG. 5a illustrates a side view of a large version of a display unit 300. FIG. 5b illustrates a back view of a large version of a display unit 300.

As will be explained in detail below, a quick release mechanism includes a striker attached to the display unit 300 and a main latch assembly attached to the seatback or other surface. Generally, to release the display unit 300 from the seatback (from the pair of quick release mechanisms 110), a person can turning an activation rod in either a clockwise or counterclockwise direction. A cam type mechanism is provided that allows the activation rod to ride up an incline of sloped teeth which pushes a lock pawl to a position which no longer traps a pawl engagement cylinder of the striker and thereby releases the display unit 300. The interfacing sloped teeth between the activation rod and the cam mechanism alternately sliding together and apart creates alternating direction translational movement which rotates the lock pawl between open and locked positions which respectively release and lock the display unit 300 to allow or prevent removal. These components and associated movements are described in detail below with reference to further illustrated figures thereof.

Figure 6:
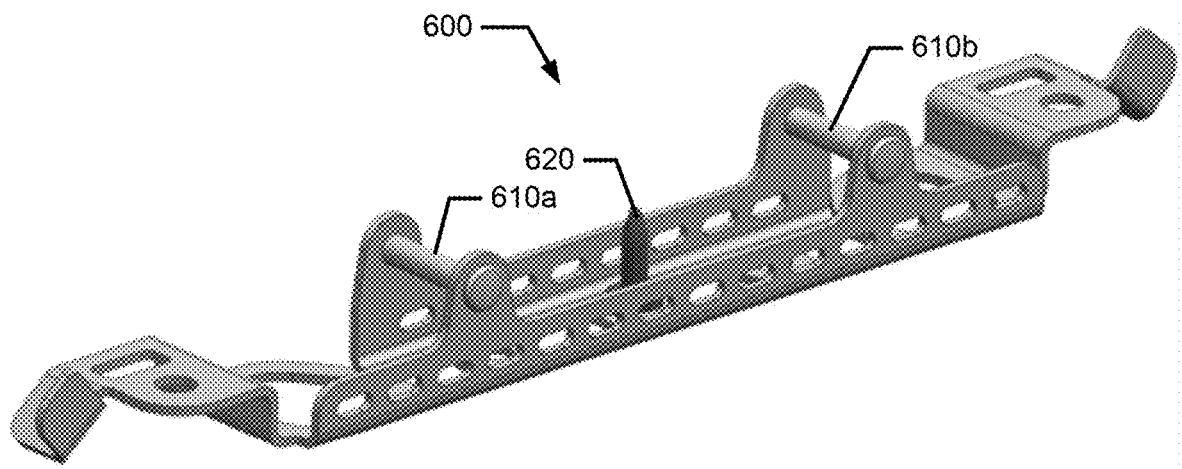
FIG. 6 illustrates a striker of a quick release mechanism configured according to some embodiments of the present disclosure.

FIG. 6 illustrates a striker 600 of a quick release mechanism 110. The striker 600 is attached to the back of the SVDU 100. The striker 600 includes a pair of pawl engagement cylinders 610a and 610b, and a guiding pin 620. The guiding pin 620 is used to assist alignment during installation of the SVDU into the back of the passenger seat. The striker 600 may be configured to not be handed, i.e., it may be installed on either side of the SVDU.

Figure 7:
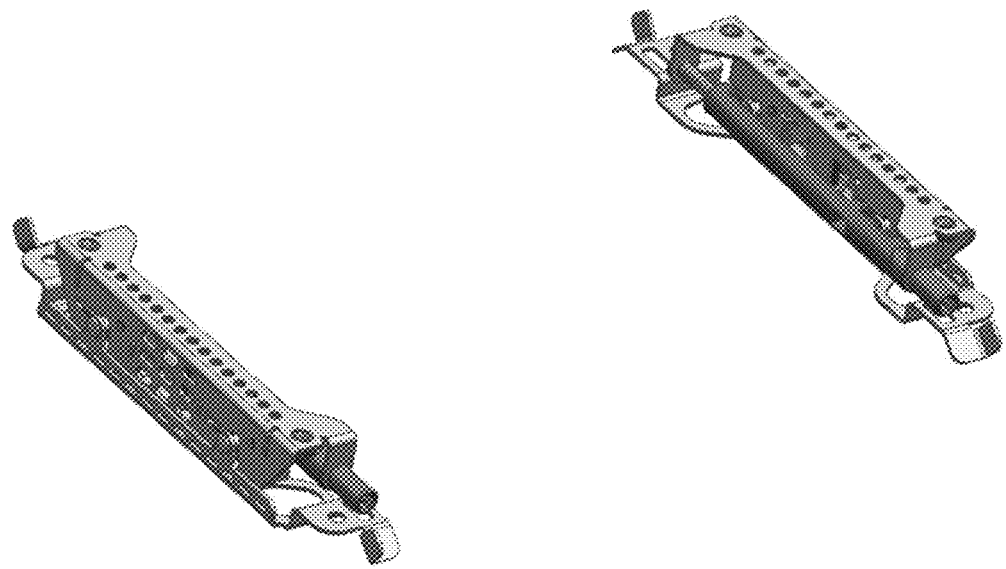
FIG. 7 illustrates a pair of main latch assemblies attached to a pair of strikers configured according to some embodiments of the present disclosure.

FIG. 7 illustrates a pair of main latch assemblies 700 attached to a pair of strikers 600. The main latch assembly 700 is attached to a SVDU receptacle in the back of a passenger seat, or can be attached to another surface such as a bulkhead, table, etc. A pair of locking pawls are configured to engage with the pair of pawl engagement cylinders 600a and 600b to lock the SVDU 100 to the SVDU receptable in the back of the passenger seat. The pair of main latch assemblies 700 are handed, so must be installed on the respective correct side of the assembly.

The system ensures that both top and bottom latches are engaged on a given side when locking the screen in place. This is one of several features implemented to prevent the case of a false lock indication. The top and bottom pawls are locked by the same lock rod if either top or bottom is not in the correct position the lock rod cannot travel to the locked position.

The system can be configured to provide an audible click that indicates a side has been correctly latched. This can be achieved by spring loading the lock rod such that when it moves into the locked position it hits the side housing causing an audible indication that the unit has latched. When an aircraft maintenance person is working to replace a display screen during a high stress time period to support a quick return to service of an aircraft, the audible click confirmation of the display side becoming locked can help speed and make more reliable the replacement process.

The system has a loaded spring pawl that pushes the screen forward when unlatched to provide a visible indication that the display screen or a side thereof is unlatched. The pawls can be configured with a sufficiently high spring force that once unlocked they will push the display screen forward to provide a visible indication to a maintenance person that the display screen has been released.

The system can support a blind insertion by the latch brackets being configured to guide the display release tool to the lock release mechanism.

Figure 8:
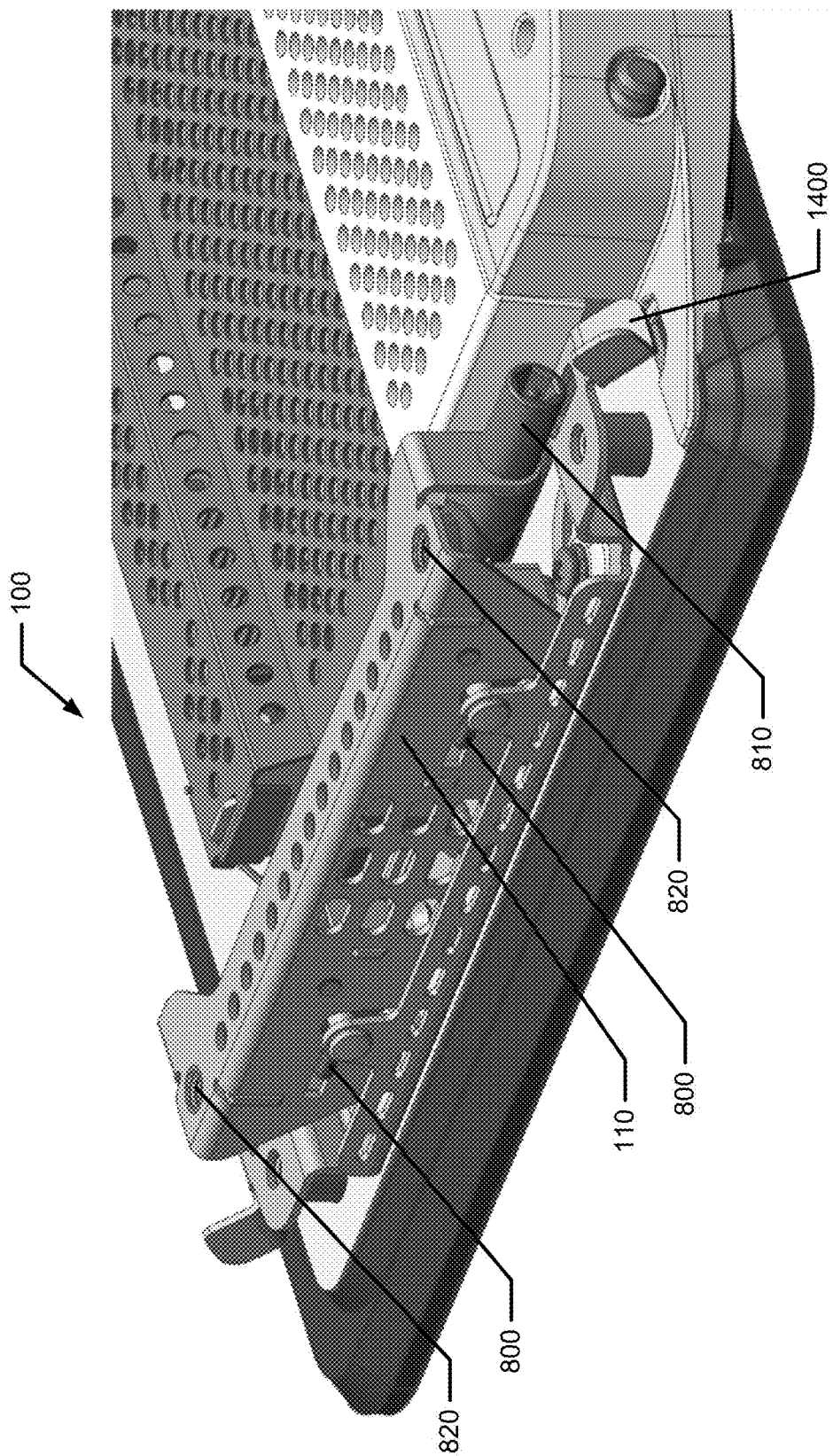
FIG. 8 illustrates an enlarged partial view of a left side of the SVDU latch system of FIG. 1 in accordance with some embodiments of the present disclosure.

FIG. 8 illustrates an enlarged partial view of a left side of the SVDU latch system of FIG. 1. Referring to FIG. 8, the main latch assembly includes a pair of latch plates 800. A display release tool may be inserted into the seatback below the display and aligned with the activation rods 810 to engage and allow crew rotation of the display release tool. For example, the display release tool may be inserted in a gap provided between the display device 300 and the seatback surface, which may serve to provide airflow to electrical components of the display device for cooling purposes. Alternatively, access to the activation rods may be provided by removing part of a seat tray housing below the display. Nut insert holes 820 are added to the main outer plate to allow screw attachment to the seatback surface.

Figure 9:
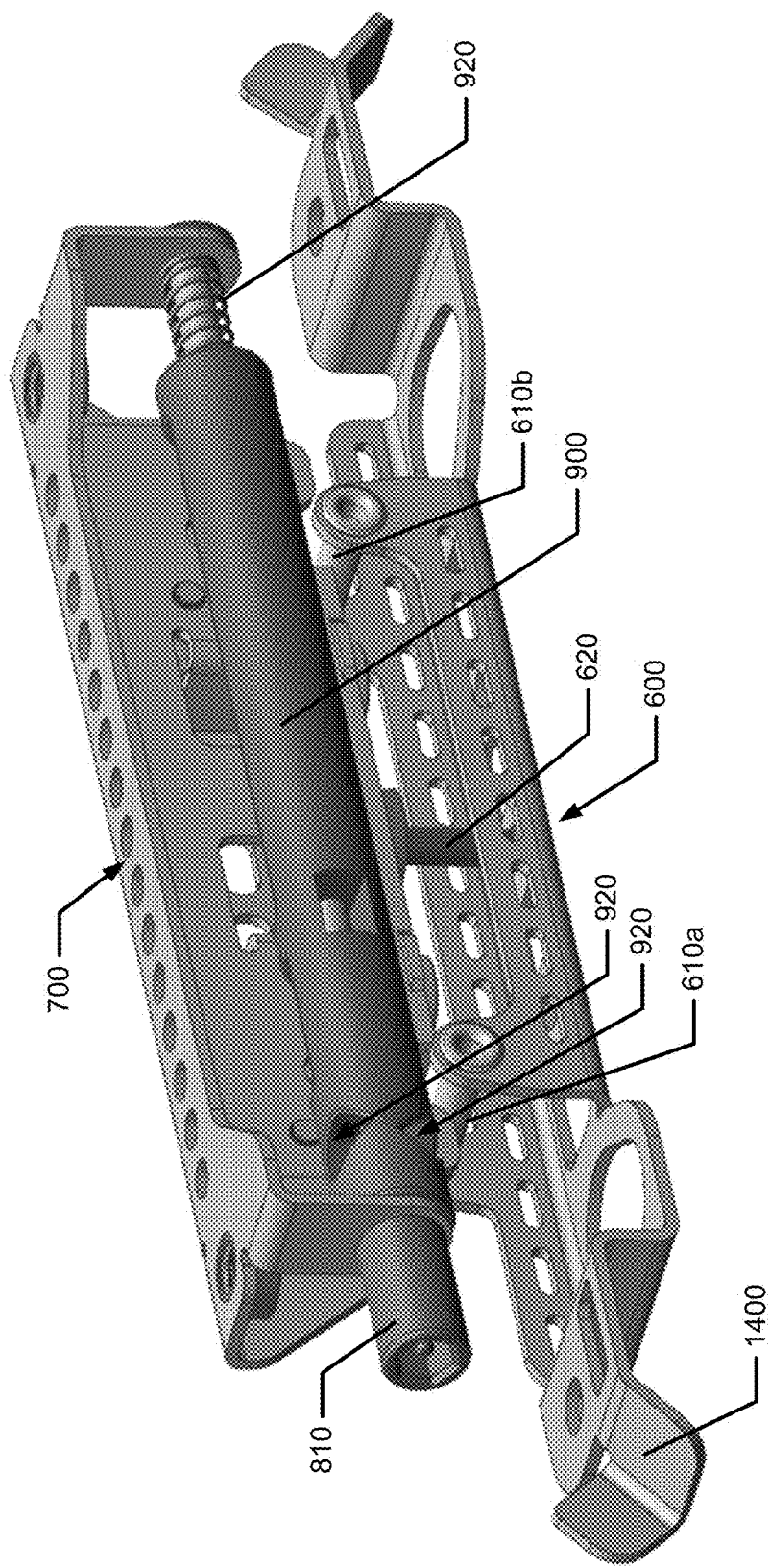
FIG. 9 illustrates a quick release mechanism with the main latch assembly separated from the striker configured according to some embodiments of the present disclosure.

FIG. 9 illustrates a quick release mechanism 110 with the main latch assembly 700 separated from the striker 600. The main latch assembly 700 includes an activation rod 810, a lock rod 900 attached to the pair of latch plates 900, a lock rod spring 910, and lock pawls (not illustrated in FIG. 9). The lock pawls engage with the pair of pawl engagement cylinders 610a and 610b to lock the striker 600 to the main latch assembly 700. The activation rod 810 engages with the lock rod 900 with sloped teeth 920. As the activation rod 810 rotates, the sloped teeth 920 causes the lock rod 900 to translationally slide in a first direction (e.g., to the right in FIG. 9) causing the pair of latch plates 800 to disengage the sloped surfaces of the mating pair of lock pawls to a freed location which disengages from and frees the pawl engagement cylinders 610a and 610b located on the striker 600. In contrast, when the activation rod 810 is rotated to a position so the sloped teeth 920 are in full contact, the lock rod 900 slides in a second direction (e.g., to the left in FIG. 9) causing the pair of latch plates 800 to engage a sloped surface of the mating pair of lock pawls, rotating the lock pawls to a trapped location engaged to lock the position of the pawl engagement cylinder located on the striker. As shown in FIG. 9, the guide pin 620 is of a sufficient length to guide the main latch assembly 700 to the striker 600.

The display quick release mechanism design protects against a failure resulting from over torqueing of the activation rod 810. Since the activation rod 810 can be turned in either direction once the disengage head is turned past the high point the system the lock rod 810 will return to the locked position. This simplifies the use of the display quick release mechanism as it does not require careful torque requirements when operating to lock a display device.

This display quick release mechanism can be used in conjunction with standard display screens but may also allow the display screen to be removed without any disassembly of the seats in either the seat back or the console mounted units. The display quick release mechanism can be operated with a simple tool and little training of line maintenance persons who can quickly remove and replace a display screen.

The display quick release mechanism can be configured to provide visual and audible indications that allow the maintenance person to determine if the display screen (display unit) is in a locked or unlocked condition.

FIGS. 10a and 10b illustrate a pair of quick release mechanisms including a pair of main latch assemblies 700 supported by a frame 1000. Referring to FIGS. 10a and 10b, the main latch assemblies include a pair of locking pawls 1010 that are resiliently biased to a locking position by latch pawl springs 1020. FIG. 10a illustrates the locking pawls 1010 in a locked position. FIG. 10b illustrates the locking pawls 1010 in an open or unlocked position. When positioned in the open or unlocked position, the locking pawls 1010 can push, via the latch pawl springs 1020, the display screen (display unit) away from the frame 1000, which provides visual indication to a maintenance person that the side of the display screen is unlocked.

Figure 11A:
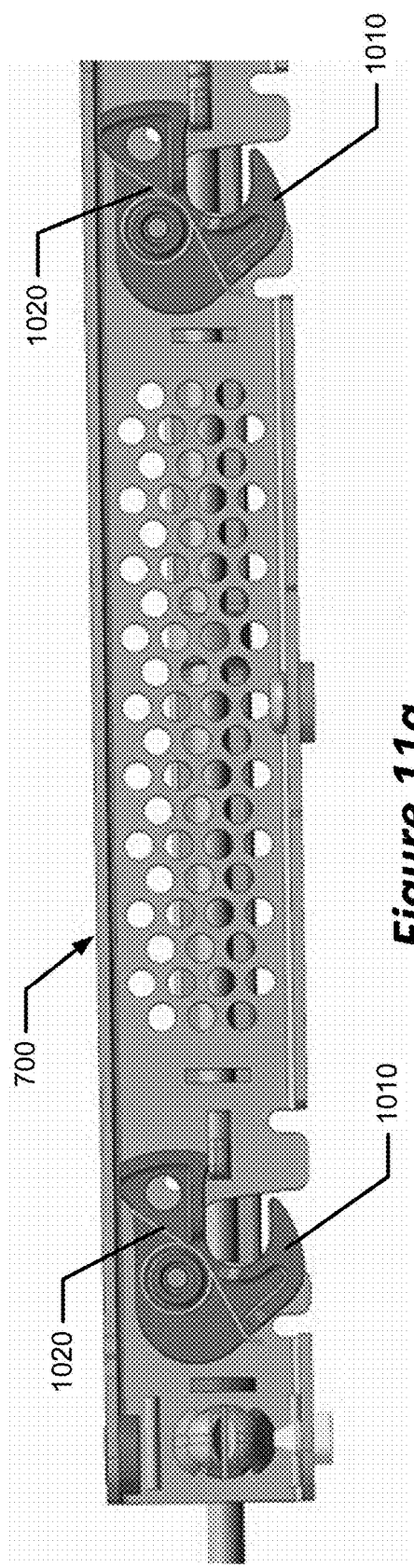
FIG. 11a illustrates another view of the locking pawls in a locked position when operating in accordance with some embodiments of the present disclosure.
Figure 11B:
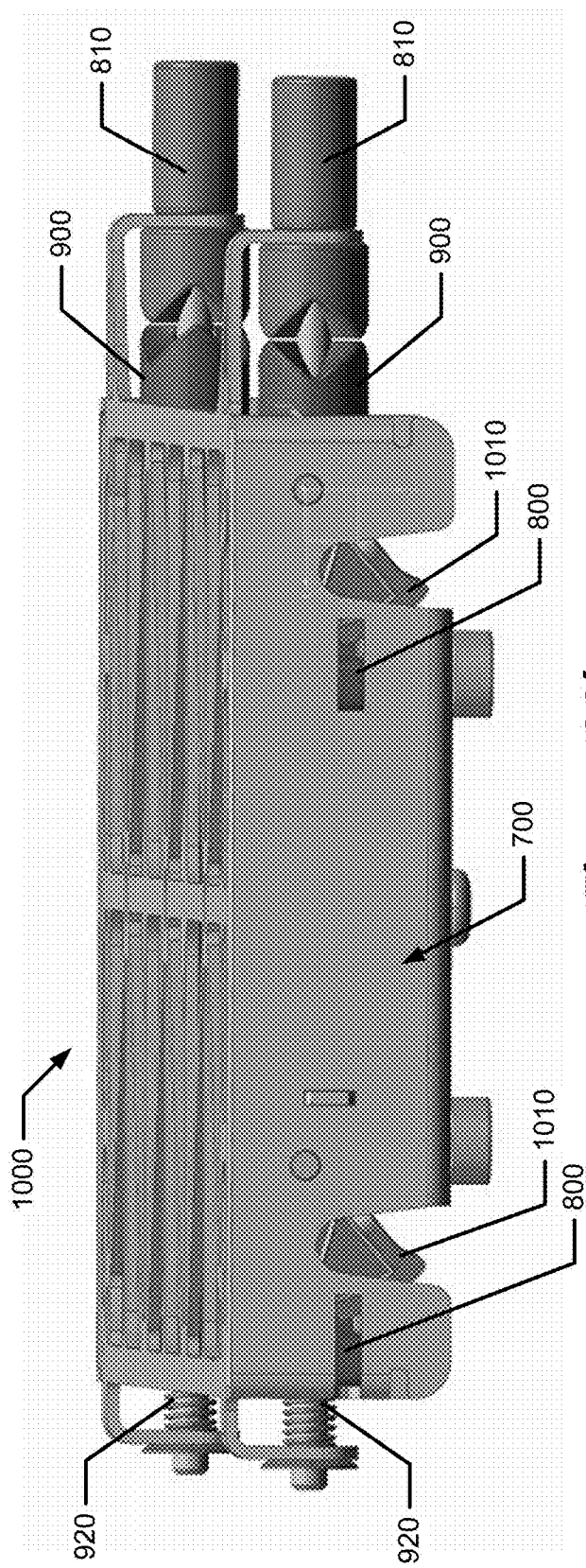
FIG. 11b illustrates another view of the locking pawls in an open or unlocked position when operating in accordance with some embodiments of the present disclosure.

FIGS. 11a and 11b illustrate another view of the quick release mechanisms. FIG. 11a illustrates the locking pawls 1010 in a locked position. FIG. 11b illustrates the locking pawls 1010 in an open or unlocked position.

Figure 12:
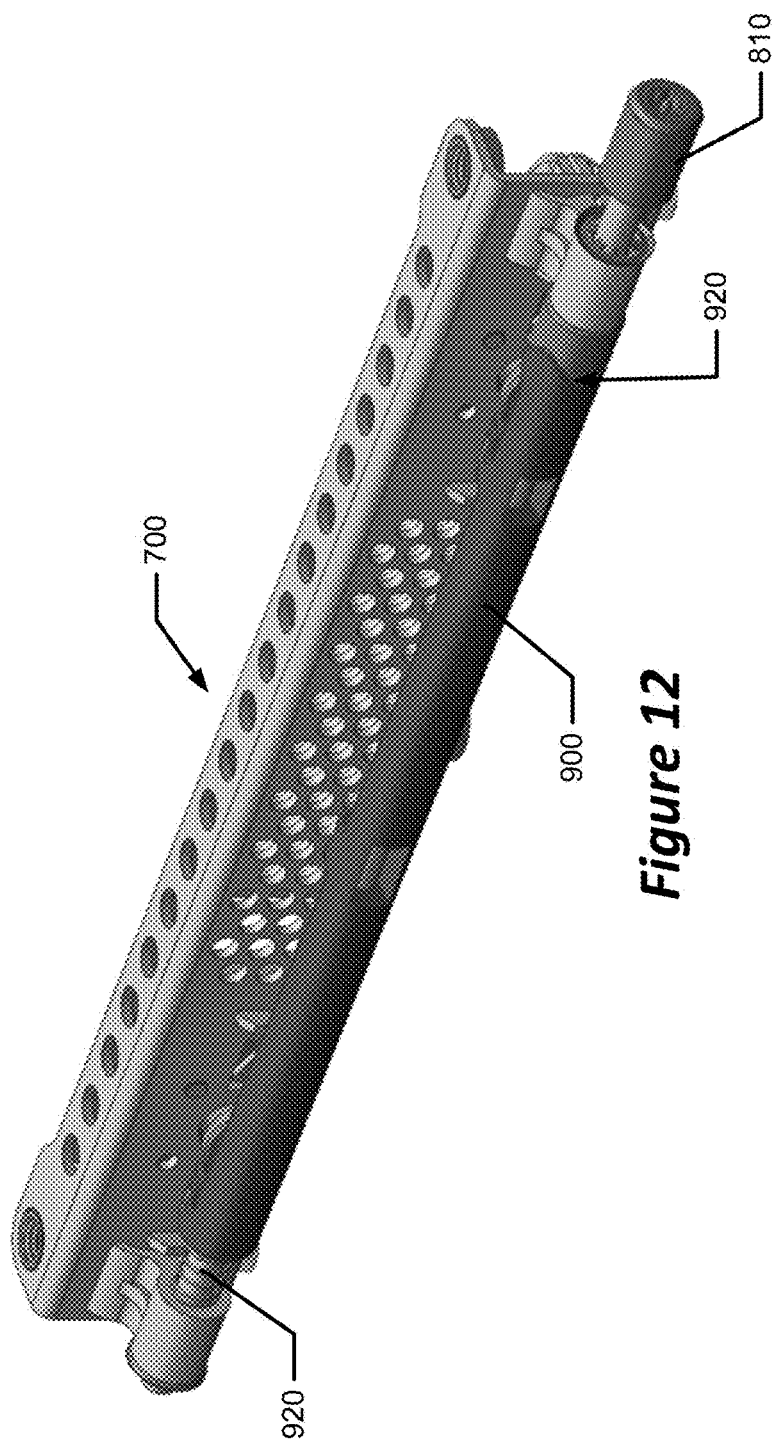
FIG. 12 illustrates a view of part of a main latch assembly for a large video display unit latch system in a locked position with the sloped teeth of the lock rod and the activation rod engaged when operating in accordance with some embodiments of the present disclosure.

FIG. 12 illustrates a view of part of a main latch assembly 700 for a large video display unit latch system in a locked position with the sloped teeth 920 of the lock rod 900 and the activation rod 810 engaged. The lock rod 900 is translationally urged to the right by the spring 920 which maintains the latch plates 800 in a position which allows the lock pawls 1010 to be in the locked position of FIG. 11a.

Figure 13:
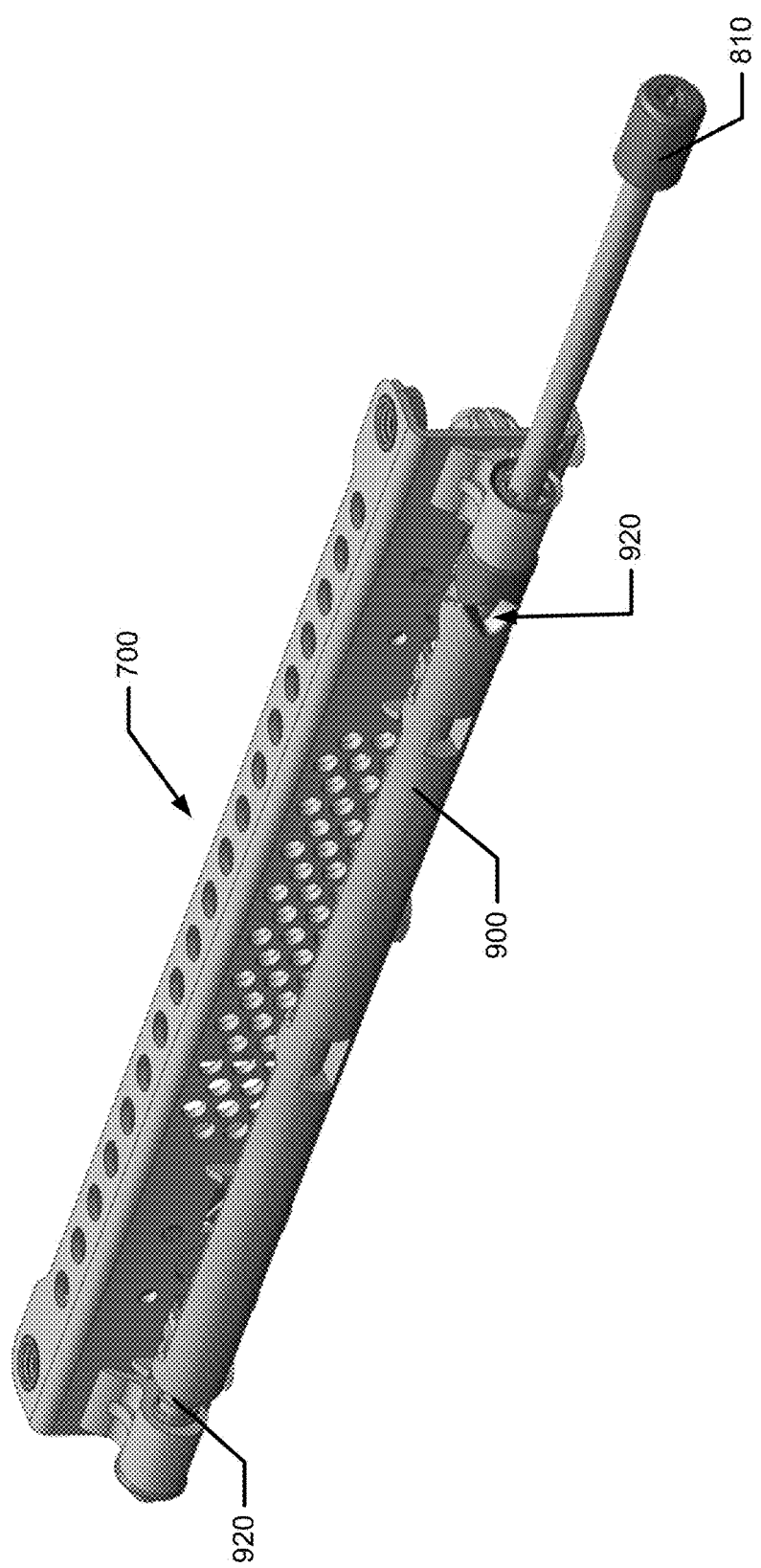
FIG. 13 illustrates a view of part of a main latch assembly for a large video display unit latch system in an unlocked position with the sloped teeth of the lock rod and the activation rod disengaged when operating in accordance with some embodiments of the present disclosure.

FIG. 13 illustrates a view of part of a main latch assembly 700 for a large video display unit latch system in an unlocked position with the sloped teeth 920 of the lock rod 900 and the activation rod 810 disengaged. The lock rod 900 is translationally slide to the left which also moves the latch plates 800 to a position which rotates the lock pawls 1010 to the open or unlocated position of FIG. 11b.

Figure 14:
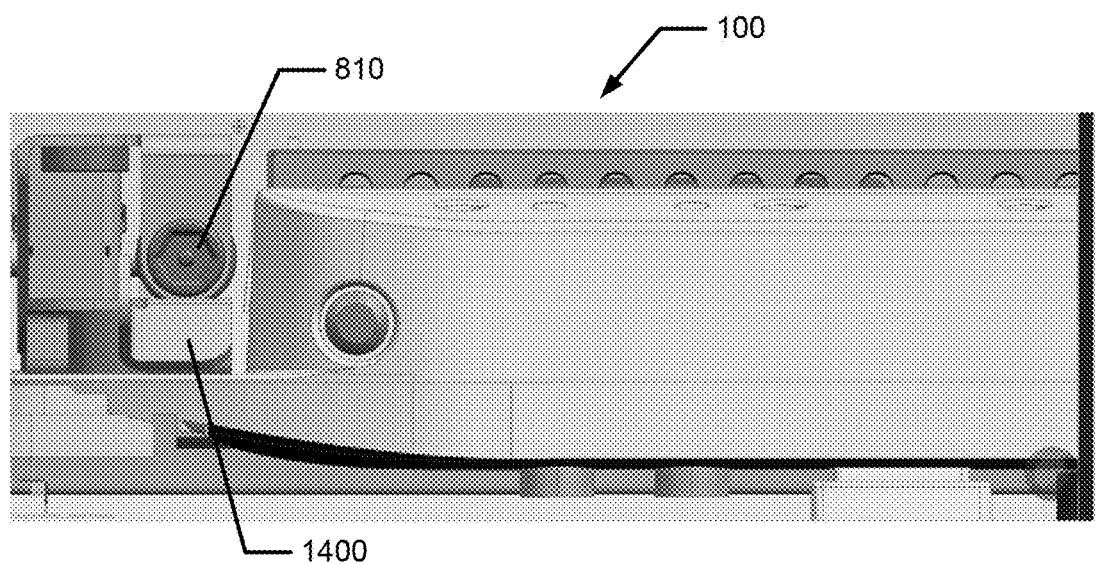
FIG. 14 illustrates a latch bracket of the SVDU attached to striker used to guide a display release tool to the activation rod configured according to some embodiments of the present disclosure.

FIG. 14 illustrates a latch bracket 1400 of the S VDU 100 attached to striker 600 used to guide a display release tool to become aligned with the activation rod 810.

Figure 15:
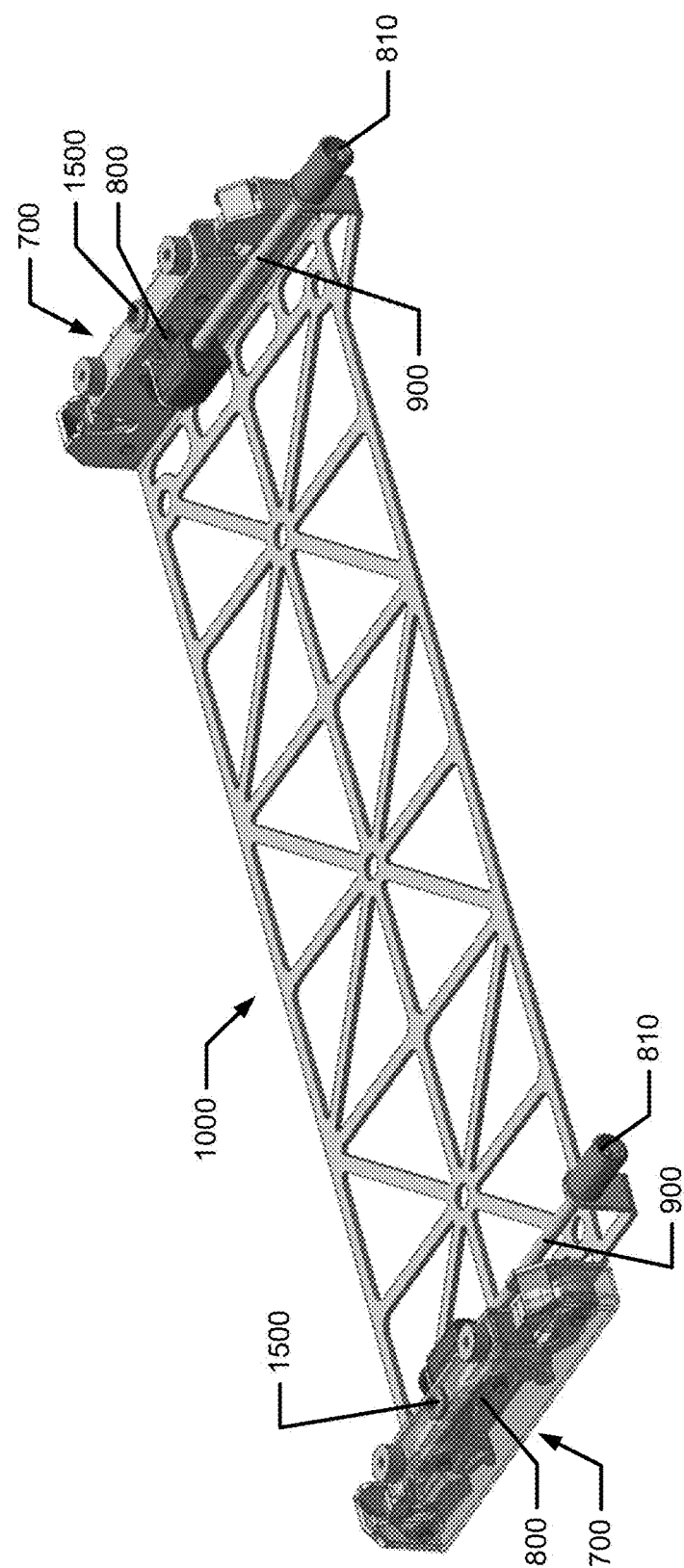
FIG. 15 illustrates a pair of main latch assemblies supported by a frame and guiding holes used to mate with guide pins on the strikers configured according to some embodiments of the present disclosure.

FIG. 15 illustrates a pair of main latch assemblies 700 supported by a frame 1000 and guiding holes 1500 used to mate with guide pins 620 on the strikers 600.

Figure 16:
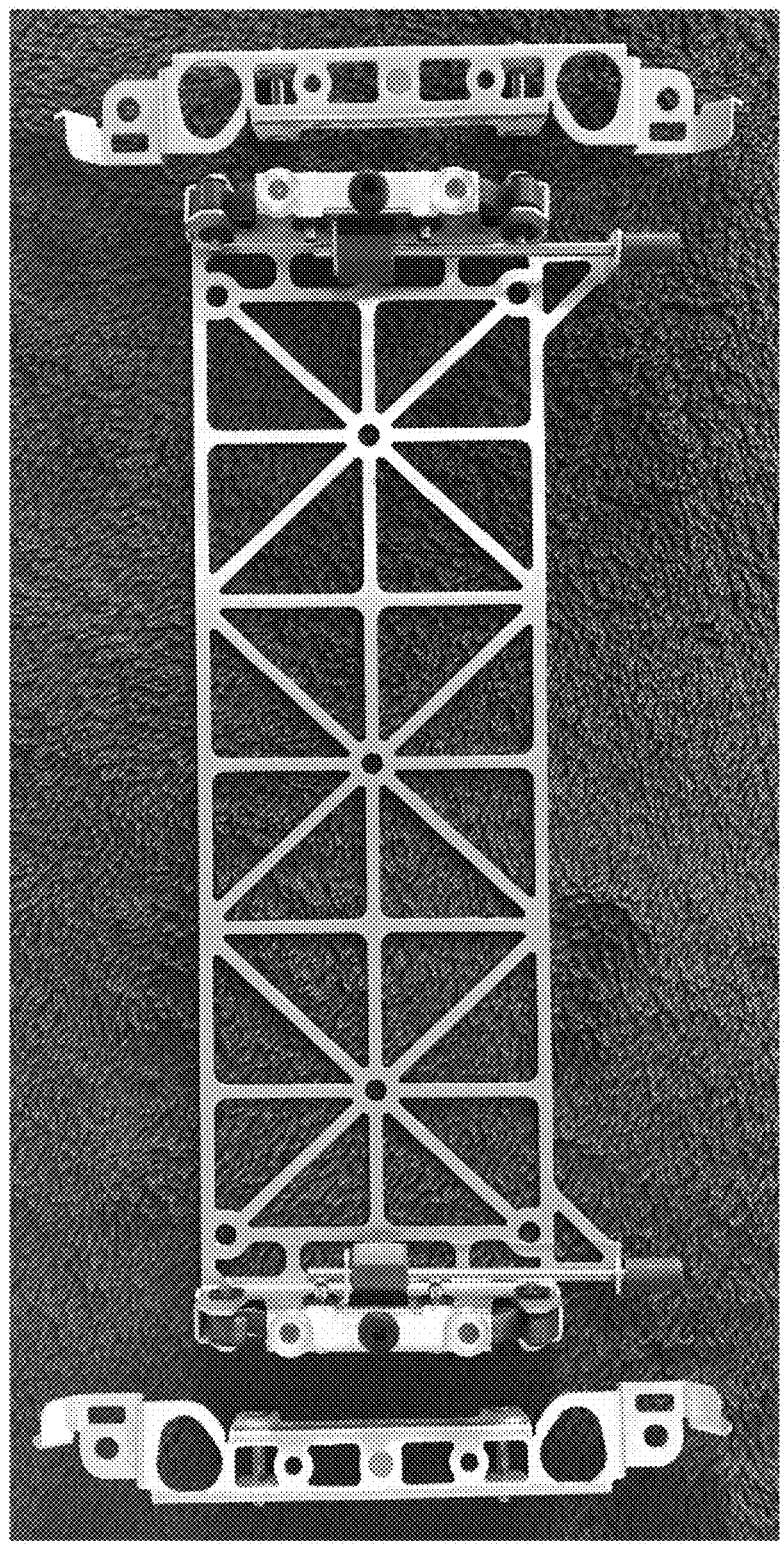
FIG. 16 illustrates a physical prototype of a quick release mechanism including a pair of strikers and a pair of main latch assemblies supported by a frame and manufactured out of a metal such as aluminum in accordance with some embodiments of the present disclosure.

FIG. 16 illustrates a physical prototype of a quick release mechanism including a pair of strikers and a pair of main latch assemblies supported by a frame, and where the illustrated components can be manufactured out of a metal such as aluminum or another lightweight material having sufficient mechanical strength to reliably operate according to embodiments herein.

Figure 17:
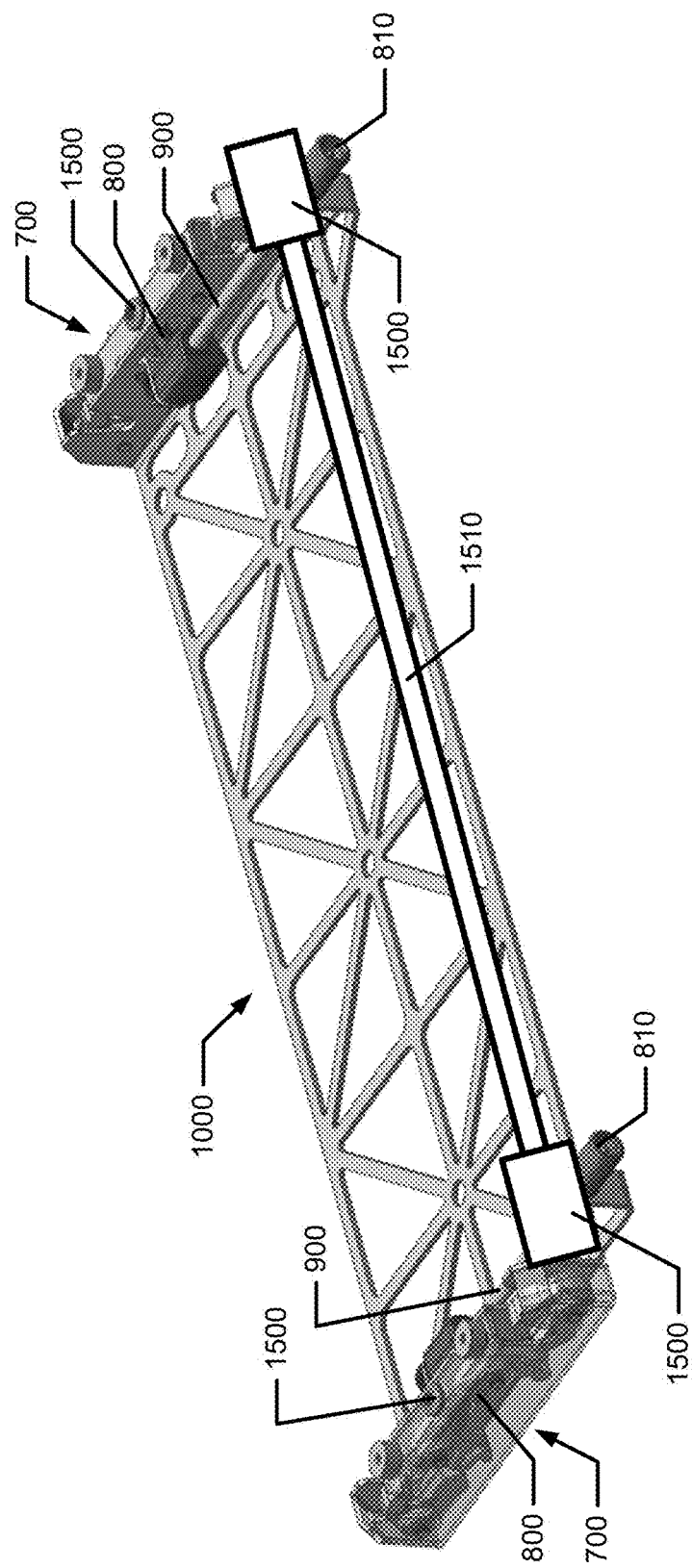
FIG. 17 illustrates an embodiment of a pair of main latch assemblies supported by a frame, in which the activation rods are mechanically interconnected by a coupling shaft configured according to some embodiments of the present disclosure.

FIG. 17 illustrates an embodiment of a pair of main latch assemblies 700 supported by a frame 1000, in which the activation rods 810 are mechanically interconnected by a coupling shaft 1510. A pair of gear mechanisms 1500 mechanically interconnects the activation rods 810 to the coupling shaft 1510. Rotation of one of the activation rods 810 causes the corresponding gear mechanism 1500 to rotate the coupling shaft 1510, which in turn causes the other gear mechanism 1500 to rotate the corresponding other activation rod 810. Said feature allows both sides to release simultaneously by activation of only a single side (i.e., rotation of a single activation rod 810).

Figure 18:
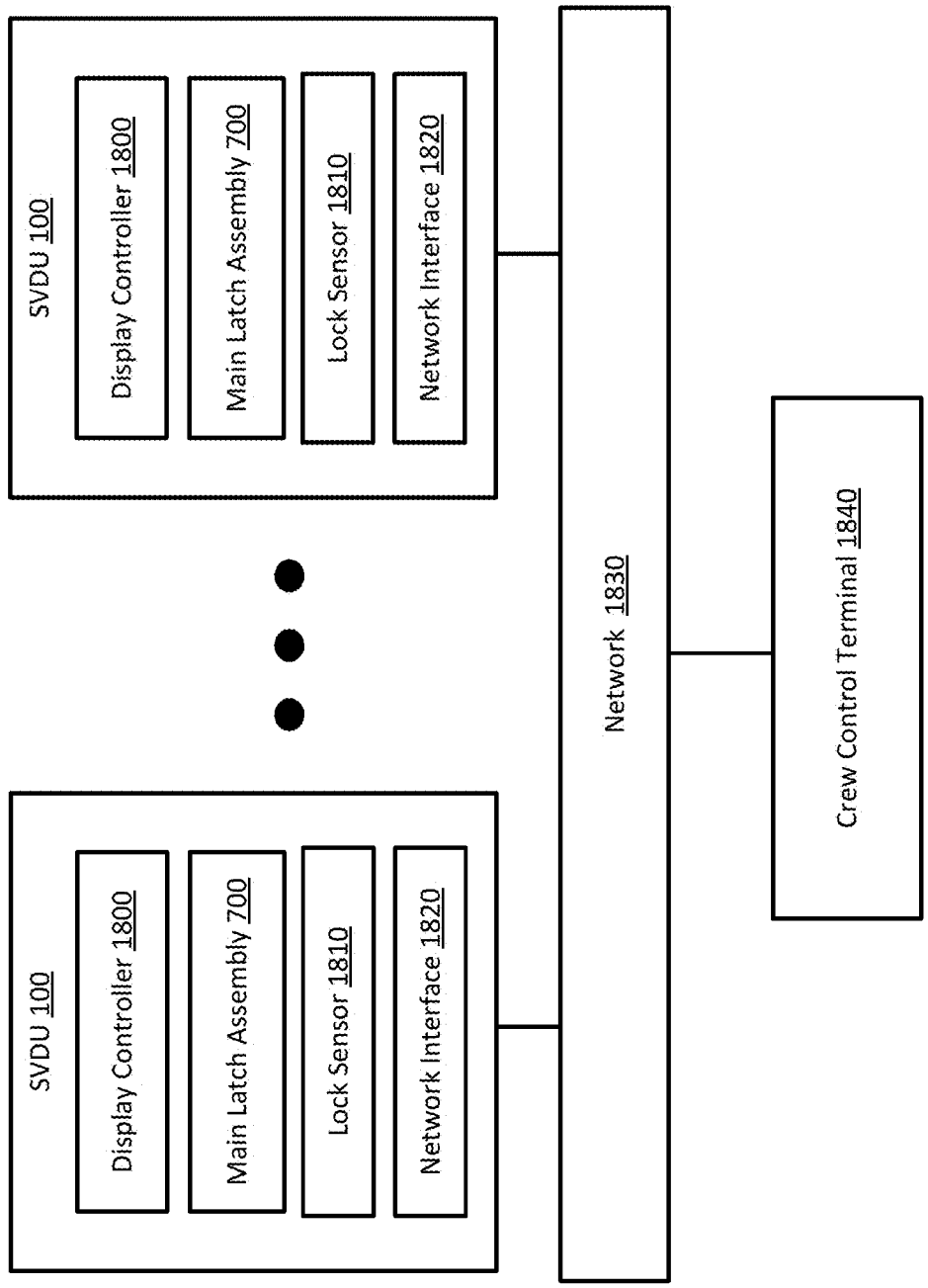
FIG. 18 illustrates a plurality of SVDUs which report the respective display lock status through a network to a crew control terminal (iCMT) when operating in accordance with some embodiments of the present disclosure.

Alternatively or additionally, the components 1500 and 1510 may include a connecting rod or splined belt that will cause the opposite side from the one being actuated to rotate thereby releasing both sides simultaneously. Due to the unique bi-directional operational ability of this system this can be achieved through a number of simplified connecting technologies similar to the two mentioned above FIG. 18 illustrates a plurality of SVDUs 100 which are configured to report the respective display lock status through a network 1830 to a crew control terminal (iCMT) 1840. Each of the SVDUs 100 can include a display controller 1800 which is configured to receive and display video on a display. The SVDUs 100 also include the main latch assembly 700 and a lock sensor 1810 which is configured to sense the display lock status of individual SVDUs indicating whether the main latch assembly 700 is locked to the striker 600. More particularly, the lock sensor 1810 is configured to sense whether the lock pawl 1010 is in a locked position around the pawl engagement cylinder 610. The SVDU 100 communicates with the network 1830 through a network interface 1820. The lock sensor 1810 is configured to report the display lock status to the iCMT 1840. A crew member or maintenance person may monitor the lock status of all of the SVDUs 100 by viewing statuses displayed on the iCMT 1840. For example, an SVDU 100 that reports an unlocked status may trigger a notification to be displayed on the iCMB 1840 indicating the SVDU 100 located at an identified seat location is unlocked. Additionally or alternatively, the display screen (display unit) of the SVDU 100 may display a notification that the SVDU 100 is unlocked, such as when the display screen is powered by a wiring harness in the seat back, e.g., coupled through a connector, but is detecting that one or both side of the display screen are unlocked.

Figure 19:
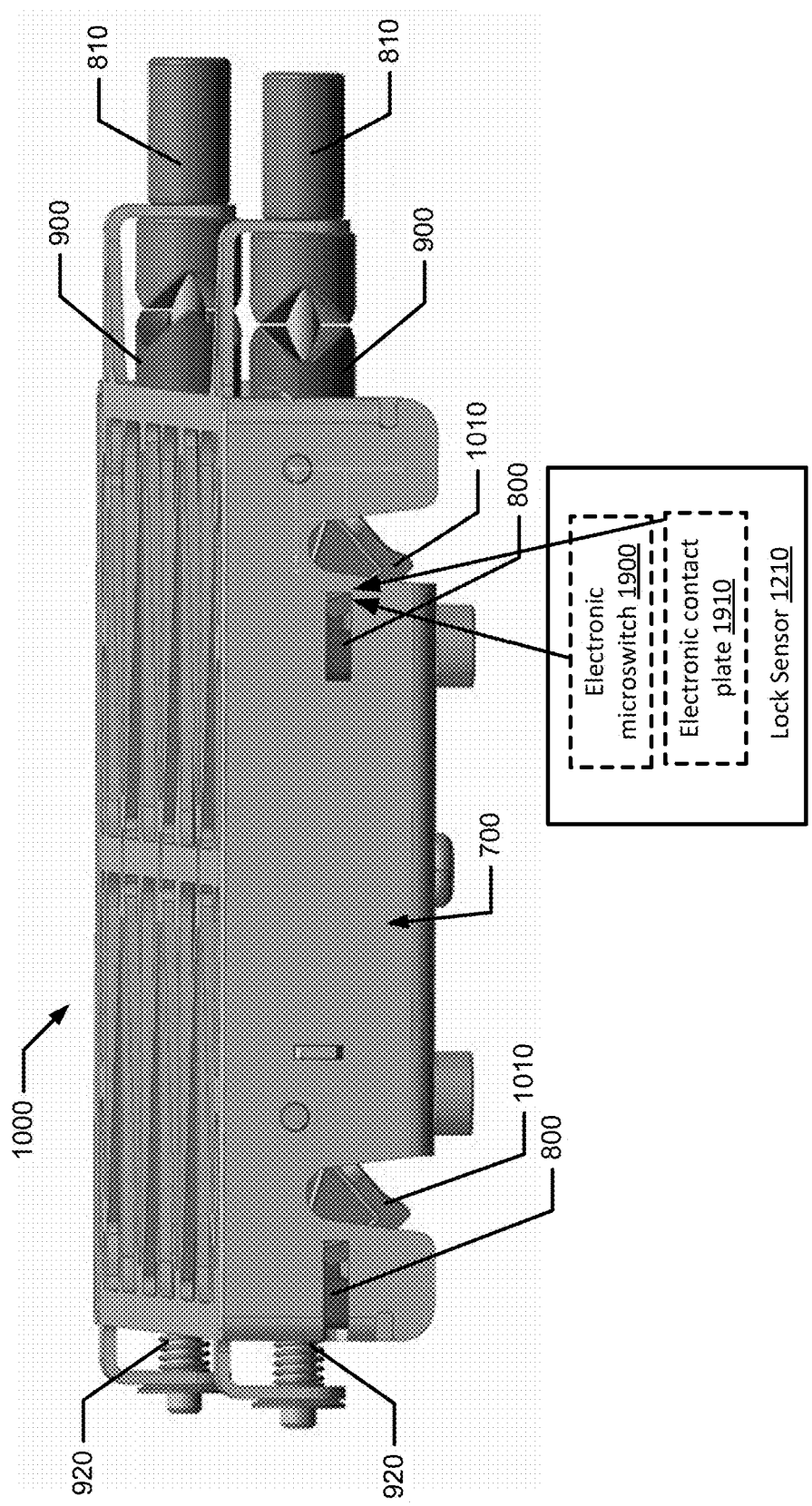
FIG. 19 illustrates a pair of main latch assemblies supported by a frame with a lock sensor including one of at least an electronic microswitch and an electronic contact plate in accordance with some embodiments of the present disclosure.

FIG. 19 illustrates a pair of main latch assemblies 700 supported by a frame 1000 with a lock sensor 1210 including one of at least an electronic microswitch 1900 and an electronic contact plate 1910 in accordance with some embodiments. In some of these embodiments, using an electronic microswitch 1900 or electronic contact plate 1910 with mating electronic contact plate on the locking rod 900 the system can provide a closed-circuit indication to the SVDU or a separate module that the display screen is locked when the circuit is closed. This signal can be transmitted back through the SVDU or through a secondary electronic signal unit back to the iCMT. In one embodiment, the latch plate 800 slides to contact the electronic microswitch 1900 and/or the electronic contact plate 1910 to close the circuit, indicating that the lock pawls 1010 are locked or unlocked around the pair of pawl engagement cylinders 610a and 610b. In another embodiment, the lock pawl 1010 rotates to contact the electronic microswitch 1900 and/or the electronic contact plate 1910 to close the circuit, indicating that the lock pawls 1010 are locked or unlocked around the pair of pawl engagement cylinders 610a and 610b.

Figure 20:
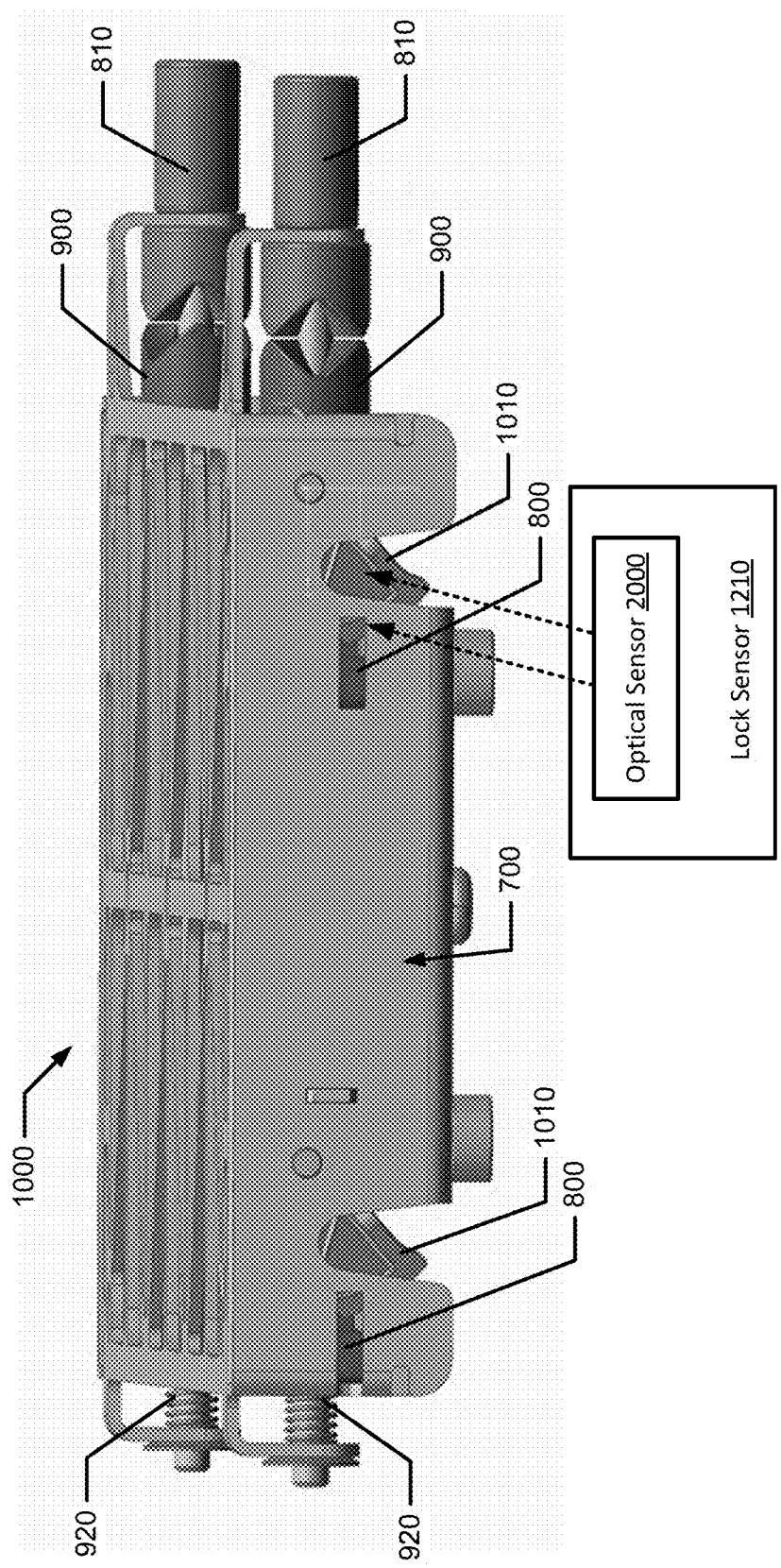
FIG. 20 illustrates a pair of main latch assemblies supported by a frame with a lock sensor including an optical sensor in accordance with some embodiments of the present disclosure.

FIG. 20 illustrates a pair of main latch assemblies 700 supported by a frame 1000 with a lock sensor 1210 including an optical sensor 2000 in accordance with some embodiments. In some of these embodiments, a lock sensor 1210 comprised of an optical unit 2000 can be used to determine if the lock rod 900 is in locked position and generate a signal to be sent back to the iCMT. This optical sensor 2000 can use a number of technologies such as infrared (IR) or other light which when reflected off the lock rod 900 will register that it is in the locked position. To designate the correct position a reflective tag would be placed on the lock rod 900 so that in the locked position this tab shows through a cut out in the side house of the main latch assembly 700, to provide the optical feedback to the sensor 1210. In another embodiment, the reflective tag sensed by the optical sensor 2000 can be on the latch plate 800. In another embodiment, the reflective tag sensed by the optical sensor 2000 can be on the latch plate 800. The locked or unlocked indication provided by the optical sensor 2000 will provide the crew that all monitors are locked in place.

In some embodiments, the locked/unlocked status signals can be used by crew terminal software on the iCMT to provide a locked and unlocked notifications graphical view on the terminal and which can be associated with a seating chart and/or another indication of seat locations associated with the locked and unlocked notifications. In some embodiments, the software can also provide a simplified status message of all locked or units open and provide a seat number indicating which seat is not locked in place. In another embodiment, an additional software option would trigger all locked SVDUs to display a solid green screen and any unlocked unit would display a solid red screen.

Some further embodiments are directed to an electronic release system. As the system must remain locked in place during any period in which the aircraft is unpowered to prevent accidental release in an emergency situation), some embodiments are directed to control when display screens can be unlocked. An electronic or similarly triggered solenoid can be positioned at the bottom of the lock rod. By triggering the solenoid the rod would raise up and push the locking rod into the unlocked position allowing the spring loaded pawls to release the display screen. This system could be actuated through a number of methods. The solenoid could be software controlled and could be triggered at the crew terminal, or through a maintenance screen on a display screen. The software would be designed to allow a nearby functioning SVDU to trigger the solenoid of a broken unit.

The solenoid could be replaced with a magnetically triggered unit or special tool which when actuated would push the lock rod up and release the pawl.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware without software or may be a combination of hardware and software executed by a computer controller.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A display apparatus receptacle configured to be mounted to a passenger seat, the display apparatus receptacle comprising:
   a pair of main latch assemblies releasably connectable to a striker of a display apparatus, wherein the pair of main latch assemblies comprise:
   an activation rod having an end with sloped teeth;
   a lock rod with an end having sloped teeth and attached to a pair of latch plates;
   a pair of lock pawls rotatable by movement of the latch plates; and
   a lock rod spring having a spiral shape about a rod extending axially through the lock rod to connect to the activation rod, the lock rod spring resiliently urging the sloped teeth of the lock rod to engage the sloped teeth of the activation rod,
   wherein the pair of locking pawls are configured to releasably latch to a pair of pawl engagement cylinders of the striker of the display apparatus.

2. The display apparatus receptacle of claim 1, wherein the pair of locking pawls are biased to a locked position by the lock rod spring pushing an end of the pair of lock rod and urging the latch plates against the pair of locking pawls.

3. The display apparatus receptacle of claim 1, wherein: the activation rod is configured to be rotated by a display release tool engaging an end of the activation rod to rotate the activation rod so the sloped teeth of the activation rod engaging the sloped teeth of the lock rod translationally slides the lock rod in a first direction causing the pair of latch plates to disengage a sloped surface of the pair of locking pawls and move to a freed location which disengages the pair of locking pawls from and frees the pawl engagement cylinders of the striker of the display apparatus.

4. The display apparatus receptacle of claim 3, wherein: sloped surfaces of the pair of lock pawls are configured to push the pair of pawl engagement cylinders of the striker of the display apparatus away from the display apparatus receptacle when in an unlocked position.

5. The display apparatus receptacle of claim 3, wherein: after translationally sliding the lock rod to a position where the pair of latch plates have disengaged the sloped surface of the pair of locking pawls, further rotation of the activation rod by the display release tool slides the lock rod in a second direction opposite to the first direction causing the pair of latch plates to re-engage the sloped surface of the pair of lock pawls and rotate the pair of lock pawls to a trapped location engaged to lock the pawl engagement cylinders of the striker of the display apparatus.

6. The display apparatus receptacle of claim 1, wherein the lock rod spring is configured to exert sufficient force on the lock rod to cause the lock rod when moving to a locked position contacting a side housing to cause an audible indication that the display apparatus is latched to the display apparatus receptacle.

7. The display apparatus receptacle of claim 1, wherein the activation rod is configured to be turned in either a counterclockwise or clockwise rotational direction using a display release tool, and once a disengage head of the activation rod is turned past a high point relative to the display apparatus receptacle where the lock rod is in an unlocked position the activation rod then returns the lock rod to a locked position.

8. The display apparatus receptacle of claim 1, wherein the pair of main latch assemblies comprise at least one guiding hole which is configured to mate with at least one guide pin of the striker of the display apparatus to guide the pair of lock pawls toward engagement with the pair of pawl engagement cylinders of the striker.

9. The display apparatus receptacle of claim 1, wherein the display apparatus receptacle further comprises a lock sensor configured to identify when the pair of locking pawls are latched to the pair of pawl engagement cylinders of the striker of the display apparatus, and to report a display lock status through a network to a crew control terminal.

10. The display apparatus receptacle of claim 9, wherein the lock sensor comprises an optical unit configured to:
determine if the lock rod is in a locked position by detecting a reflective tag on the lock rod that, while in the locked position, is exposed through a cut out in a side house of the main latch assembly; and
based on if the lock rod is in a locked position, report the display lock status in a notification to the crew control terminal.

11. The display apparatus receptacle of claim 9, wherein the lock sensor comprises an optical unit configured to:
determine if the lock rod is in a locked position by detecting a reflective tag on at least one of the pair of latch plates; and
based on if the lock rod is in a locked position, report the display lock status in a notification to the crew control terminal.

12. A display assembly comprising:
a display apparatus receptacle configured to be mounted to a passenger seat; and
a display apparatus,
wherein the display apparatus receptacle comprises:
a pair of main latch assemblies releasably connectable to a striker of the display apparatus, wherein the pair of main latch assemblies comprise:
an activation rod having an end with sloped teeth;
a lock rod with an end having sloped teeth and attached to a pair of latch plates;
a pair of lock pawls rotatable by movement of the latch plates; and
a lock rod spring having a spiral shape about a rod extending axially through the lock rod to connect to the activation rod, the lock rod spring resiliently urging the sloped teeth of the lock rod to engage the sloped teeth of the activation rod,
wherein the pair of locking pawls are configured to releasably latch to a pair of pawl engagement cylinders of the striker of the display apparatus;

wherein the display apparatus comprises:
a display;
the striker attached to a back surface of the display apparatus that is releasably connectable to the pair of main latch assemblies in the display apparatus receptacle in the passenger seat, wherein the striker comprises:
a latch bracket;
a pair of pawl engagement cylinders connected to the latch bracket and positioned to be releasably engaged by the pair of main latch assemblies;
a guiding pin connected to the latch bracket and positioned relative to the pair of pawl engagement cylinders to guide their engagement with the pair of main latch assemblies.

13. The display assembly of claim 12, wherein the guiding pin is of a sufficient length to enter a guiding hole of the pair of main latch assemblies in the display apparatus receptacle to guide engagement of the pair of pawl engagement cylinders with the pair of main latch assemblies.

14. The display assembly of claim 12, wherein the pair of locking pawls are biased to a locked position by the lock rod spring pushing an end of the pair of lock rod and urging the latch plates against the pair of locking pawls.

15. The display assembly of claim 12, wherein:
the activation rod is configured to be rotated by a display release tool engaging an end of the activation rod to rotate the activation rod so the sloped teeth of the activation rod engaging the sloped teeth of the lock rod translationally slides the lock rod in a first direction causing the pair of latch plates to disengage a sloped surface of the pair of locking pawls and move to a freed location which disengages the pair of locking pawls from and frees the pawl engagement cylinders of the striker of the display apparatus.

16. The display assembly of claim 15, wherein:
the latch bracket is configured to guide the display release tool to a lock release mechanism of the pair of pawl engagement cylinders.

17. The display assembly of claim 15, wherein:
sloped surfaces of the pair of lock pawls are configured to push the pair of pawl engagement cylinders of the striker of the display apparatus away from the display apparatus receptacle when in an unlocked position.

18. The display assembly of claim 15, wherein:
after translationally sliding the lock rod to a position where the pair of latch plates have disengaged the sloped surface of the pair of locking pawls, further rotation of the activation rod by the display release tool slides the lock rod in a second direction opposite to the first direction causing the pair of latch plates to re-engage the sloped surface of the pair of lock pawls and rotate the pair of lock pawls to a trapped location engaged to lock the pawl engagement cylinders of the striker of the display apparatus.

19. The display assembly of claim 12, wherein the lock rod spring is configured to exert sufficient force on the lock rod to cause the lock rod when moving to a locked position contacting a side housing to cause an audible indication that the display apparatus is latched to the display apparatus receptacle.

20. The display assembly of claim 12, wherein the display apparatus receptacle further comprises a lock sensor configured to identify when the pair of locking pawls are latched to the pair of pawl engagement cylinders of the striker of the display apparatus, and to report a display lock status through a network to a crew control terminal.

* * * * *